(12) United States Patent
Young (10) Patent No.: US 6,390,945 B1
(45) Date of Patent: May 21, 2002

(54) FRICTION GEARING CONTINUOUSLY VARIABLE TRANSMISSION

(75) Inventor: James Robert Young, Indianapolis, IN (US)

(73) Assignee: Ratio Disc Corp., Las Vegas, NV (US)

( * ) Notice: Subject to any disclaimer, the term of this patent is extended or adjusted under 35 U.S.C. 154(b) by 0 days.

(21) Appl. No.: 09/834,714

(22) Filed: Apr. 13, 2001

(51) Int. Cl.$^7$ ............................................... F16H 15/00
(52) U.S. Cl. ......................................... 475/186; 476/50
(58) Field of Search ................................ 475/186, 191, 475/195; 476/47, 50, 54, 56, 57

(56) References Cited

U.S. PATENT DOCUMENTS

| | | | |
|---|---|---|---|
| 1,093,922 A | | 4/1914 | Dietrich |
| 1,655,503 A | * | 1/1928 | Knoller .................. 476/48 |
| 2,057,482 A | * | 10/1936 | Erban ..................... 475/191 |
| 3,264,890 A | * | 8/1966 | Erban ..................... 476/48 |
| 3,440,894 A | | 4/1969 | Hammann et al. |
| 3,527,112 A | * | 9/1970 | Korell ..................... 476/50 |
| 5,353,578 A | * | 10/1994 | Irby et al. ............... 476/58 |

OTHER PUBLICATIONS

SAE PT–30, Continuously Variable Transmissions, ISBN 0–89883–118–0, 1987, p. 196–212, SAE Warrendale PA 15096.

* cited by examiner

Primary Examiner—Charles A Marmor
Assistant Examiner—Ankur Parekh (57) ABSTRACT

Continuously variable transmission consists of two rolling friction planetaries with a transversely mounted disk interposed between wheels of the planetaries. Varying the position of the disk varies the speed ratio. Transmitted forces urge an idler wheel into a converging space between the internal ring and the wheel in contact with the disk so as to establish contact forces as a function of transmitted torque. Ratio change is made easy by temporarily moving the disk laterally and utilizing the resultant change in contact position to establish a velocity vector which urges the disk toward a new position using only the power being transmitted. Well-known gear systems are used to extend the ratio range. Well-known tractants, or friction enhancing lubricants are used as lubricants to prevent wear yet maximize capacity.

15 Claims, 9 Drawing Sheets

FRICTION GEARING CONTINUOUSLY VARIABLE TRANSMISSION

CROSS-REFERENCE TO RELATED APPLICATIONS

Not Applicable.

BACKGROUND

1. Field of the Invention

This invention relates to friction gearing continuously variable transmissions, specifically to an improved mechanism for transmitting power through tractional or frictional engagement of rings, wheels and a disk or disks.

Unique features relate to efficiency, control of loads in response to transmitted torque, control of speed ratio, maximum power capacity, reliability and manufacturing costs.

2. Description of Prior Art

Many continuously variable transmission concepts have been proposed in the past for vehicle and industrial applications.

Electrical, hydraulic, and mechanical methods have been proposed with many sub-categories and many combinations of sub-categories.

No proposed method has yet been accepted in the manner of either manual or automatic transmissions. This is because the prior art has failed in one or more requirements. Poor efficiency has been a major deterrent to most proposed systems. Damage during use or lack of reliability has likewise been a major deterrent. Complexity of control has been a major difficulty. The inability to transmit the power developed by large engines has been a limitation. High precision and high costs of precision have been substantial problems. The need for high capacity bearings to support high contact forces has been a limitation both because of bearing capacity and because of bearing power losses. Bearing power losses are higher with friction enhancing lubricants. Many other miscellaneous problems were also encountered.

Still, it is recognized that a continuously variable transmission which could overcome these problems would have operating fuel economies of real significance because engines, or prime movers, would be able to operate at more economical conditions. Thus saving valuable energy. Simultaneously, a proper continuously variable transmission would produce better acceleration, speed and deceleration performances.

Much of the mechanical prior-art has utilized the principle of transmitting power through rolling contact between two bodies. This principle can be used in a dry atmosphere like air and like halocarbon vapor; or, it can be used in the presence of various liquids. Some liquids have been developed specifically for this purpose and are known as tractants. These tractants lubricate surfaces, as do common oils, but they excel at supporting high shear stresses under contact conditions of high local pressures.

In order to avoid high power losses in traction mechanisms, it is necessary to reduce the contact force when the transmission is operating at less than maximum torque.

On the other hand, a time delay between a sudden increase in torque and the corresponding increase in contact force has been the cause of catastrophic damage to the rolling surfaces when slippage has occurred. Prior-art systems have been too slow to prevent such damage in the worst conditions.

The limited speed range of most of the prior-art has been partially overcome by using various combinations of fixed ratio gearing, clutches, brakes and the like. Compatibility with these systems is not shared by all prior-art but it is a major factor in some systems.

Currently there are three systems which appear to be favored by the automotive industry.

Firstly, the double toric system which has been under development for nearly a century. This system eliminates the need for high capacity bearings to support contact forces, but it suffers from a number of other factors: a. the need to control six rollers all in different planes, simultaneously, in order to change ratio; b. high inertia and flexibility of parts needed to respond to sudden torque changes for the prevention of catastrophic slippage; c. high manufacturing costs for the high precision rollers, concave faces and control mechanisms; d. power losses in the rolling contacts due to what is referred to as "spin".

Secondly, the system known as the double half-toroid. This system minimizes the power losses due to spin but it suffers from: a. the need to support high contact forces with bearings, and their attendant power losses; b. high manufacturing costs for rollers, concave discs, and the control mechanisms; c. the need to control four rollers, in different planes, simultaneously, to change the ratio; d. high inertia of parts needed to respond to a sudden change in torque for the prevention of catastrophic slippage.

Thirdly, the system known as the VanDoorne metal belt. This system has had some success in vehicles with small engines but it suffers from a number of factors: a. it can't handle the power from big engines; b. it has poor efficiency when operarted at part load; c. the ratio change hydraulics have to be coordinated with the pressure needed to prevent slippage; d. the system is noisy.

In short, the prior-art has to be improved substantially to meet the requirements of a successful system. Such improvements are described in the following explanation of the invention.

OBJECTS AND ADVANTAGES

It is an object of the present invention to provide a continuously variable transmission system of high efficiency.

It is another object of the invention to provide a continuously variable transmission with improved resistance to slipping damage encountered by sudden changes in torque.

It is yet another object of the invention to provide a continuously variable transmission capable of handling the power from large engines as well as from small engines.

Another object is to improve the ease of controlling speed ratio by reducing the complexity of elements needed to effect ratio changes.

It is a further advantage to achieve the above objects in an economical manner using easily manufactured parts.

It is an additional advantage to achieve compatibility with other mechanical devices for extending the speed ratio range.

It is a significant object to provide a continuously variable transmission which is compatible with known oils or tractants.

It is an advantage to eliminate the need for bearings to support high contact forces because of their cost, because of their power losses and because of their size limitations.

These and other objects and advantages of the present invention will become apparent from the following description of the accompanying drawings, which disclose several embodiments of the invention. It is to be understood that the drawings are to be used for purposes of illustration only, and not as a definition of the invention.

SUMMARY

In accordance with the present invention, a disk is interposed between members of two friction gearing planetaries so as to permit transmission input and output speed ratios to be changed by changing the position of the disk with respect to the planetaries, simultaneously the contact forces are adjusted to accomodate changes in torque.

DRAWINGS

Figures

Further advantages and details can be gleaned from the drawings wherein similar reference numerals denote similar elements throughout the several views.

DETAILED DESCRIPTION

Figure 1:
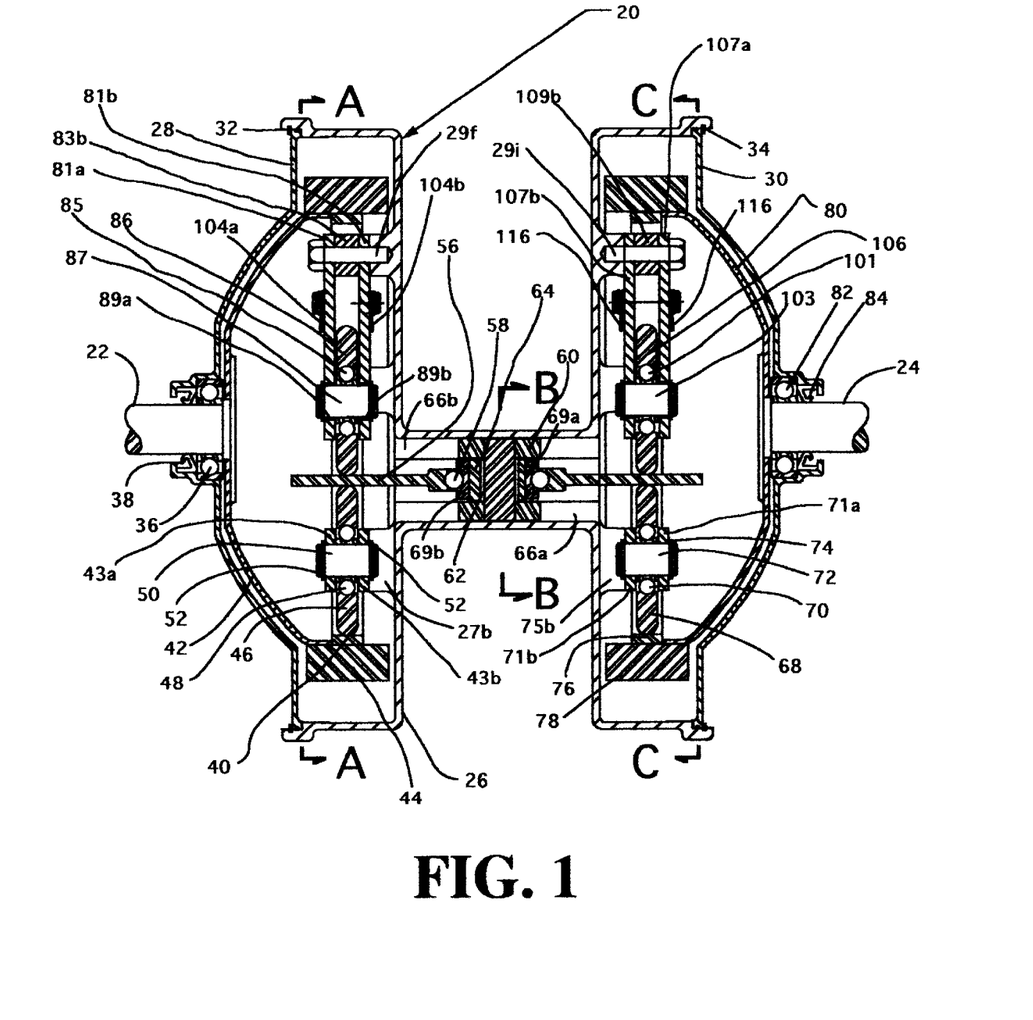
FIG. 1 is a side elevation view, partially in cross-section, of the present invention depicting a disk in rolling friction contact with wheels of two planetaries.
Figure 2:
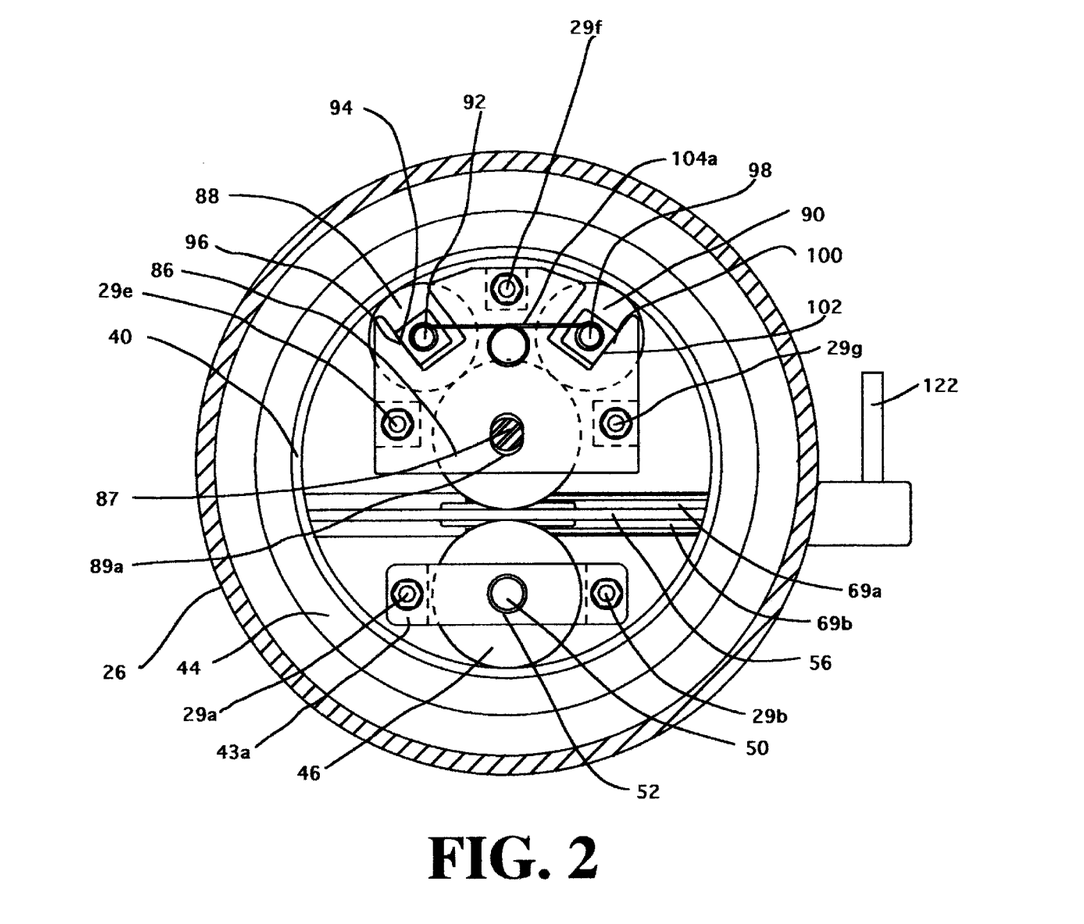
FIG. 2 is an elevation view, along the line A—A of FIG. 1, depicting the planetary wheels in rolling friction contact with the disk and, additionally, the idler wheels used to establish torque responsive contact loading.
Figure 3:
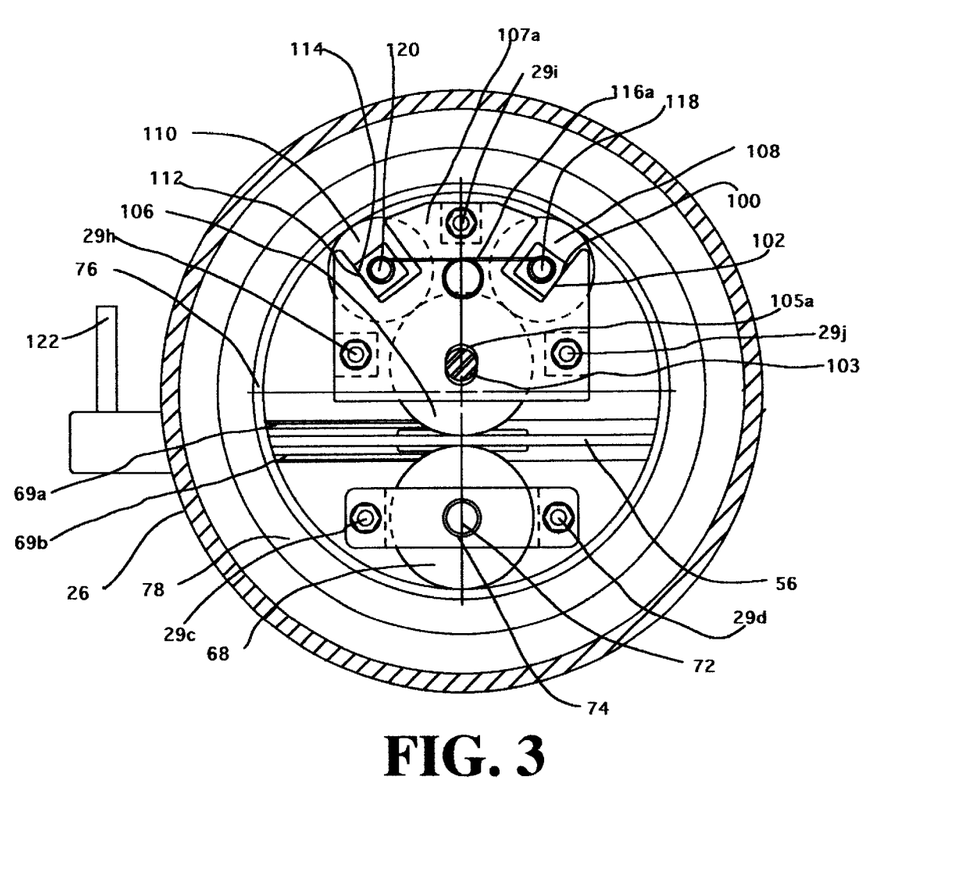
FIG. 3 is an elevation view, along the line C—C of FIG. 1, depicting the planetary wheels in rolling friction contact with the disk and, additionally, the idler wheels used to establish torque responsive contact loading.

Referring to FIG. 1, FIG. 2 and to FIG. 3, 20 is a continuously variable transmission (CVT) having a shaft 22 on the left and a shaft 24 on the right; either shaft may be used as the power input while the other is the power output. A casing 26 and end bells 28 and 30, constitute the CVT housing. Retaining rings 32 and 34 secure the end bells to the casing.

Bearing 36 rotatably supports shaft 22. Seal 38 seals shaft 22. Ring 40 is driveably connected to shaft 22 through members 42 and 44. Wheel 46 contacts the inner diameter of ring 40 and is rotatably supported by a bearing 48 on pin 50. Pin 50 is supported by retainer plates 43a and 43b. Retainer plates 43a and 43b are separated by spacers and are fastened to two bosses one of the bosses is shown in FIG. 1 and is numbered 27b on casing 26 with screws 29a and 29b. Retaining rings 52 secure the pin 50 against axial movement.

Disk 56 contacts wheel 46 at a point opposite the contact of wheel 46 and ring 40. Disk 56 is rotatably supported by a bearing 58 which is eccentrically mounted to a track roller assembly 60 through needle bearing 62 and eccentric 64. Track roller assembly 60 consists of two rollers pressed onto a shaft. The track roller assembly is guided by ways 66a and 66b in casing 26. Control arms 69a and 69b are mounted to eccentric 64.

Another wheel, 68, contacts disk 56 on the opposite side of the disk center from wheel 46. Wheel 68 contacts the inner diameter of ring 76 and is rotatably supported by a bearing 70 on pin 72. Pin 72 is supported by retainer plates 71a and 71b. Retainer plates 71a and 71b are separated by spacers and are fastened to bosses one of the bosses is shown in FIG. 1 and is numbered 75b on casing 26 with screws 29c and 29d. Retaining rings 74 secure the pin 72 against axial movement.

Ring 76 is attached to stiffening ring 78 and web 80 which driveably connect to shaft 24. Bearing 82 rotatably supports shaft 24 to end bell 30. Seal 84 provides sealing for shaft 24.

Sun wheel 86 contacts disk 56 on the face opposite the contact with wheel 46. Bearing 85 supports sun wheel 86 on pin 87. Pin 87 is mounted in slots 89a and 89b which are elongated in a radial direction perpendicular to the surface of disk 56, as shown in FIG. 2. Slots 89a and 89b are part of roller retainers 81a and 81b, respectively, which are separated by three spacers one of which is shown in FIG. 1 and is numbered 83b. Screws 29e, 29f and 29g fasten the retainers and spacers to bosses of housing 26.

The centerline of sun wheel 86 is positioned away from the centerline of ring 40 so that the gap between the inside diameter of ring 40 and the outside diameter of sun wheel 86, shown in FIG. 2, changes in width. Load wheels 88 and 90 are respectively in contact with sun wheel 86 and ring 40, and positioned in the aforesaid gap. Load wheel 88 is rotatably mounted on a bearing 92, which is only partially constrained. The inner race of bearing 92 has protrusions with abutment surfaces 94. Abutment surfaces 94, and 96 on the roller retainers 81a and 81b, limit the position of the inner race and hence, the wheel 88.

Wheel 90 is rotatably mounted on bearing 98 and limited in position by abutment surfaces 100 and 102. Springs 104a and 104b are in tension and force bearings 92 and 98 closer together, resulting in pre-load forces of contact between members of the planetary contained within ring 40.

Seal 84 provides sealing for shaft 24.

Sun wheel 106 contacts disk 56 on the face opposite the contact with wheel 68. Bearing 101 supports sun wheel 106 on pin 103. Pin 103 is mounted in slots 105a and 105b which are elongated in a radial direction perpendicular to the surface of disk 56, as shown in FIG. 3. Slots 105a and 105b are part of roller retainers 107a and 107b, respectively, which are separated by spacers 109a, 109b and 109c. Screws 29h, 29i and 29j fasten the retainers and spacers to bosses 27h, 27i and 27j of housing 26.

The centerline of sun wheel 106 is positioned away from the centerline of ring 76 so that the gap between the inside diameter of ring 76 and the outside diameter of sun wheel 106, shown in FIG. 3, changes in width. Load wheels 108 and 110 are respectively in contact with sun wheel 106 and ring 76, and positioned in the aforesaid gap. Load wheel 108 is rotatably mounted on a bearing 118, which is only partially constrained . The inner race of bearing 118 has protrusions with abutment surfaces 100. Abutment surfaces 100, and 102 on the roller retainers 107a and 107b, limit the position of the inner race and hence, the wheel 106.

Wheel 110 is rotatably mounted on bearing 120 and limited in position by abutment surfaces 114 and 112. Springs 116a and 116b are in tension and force bearings 118 and 120 closer together, resulting in pre-load forces of contact between members of the planetary contained within ring 76.

Figure 4:
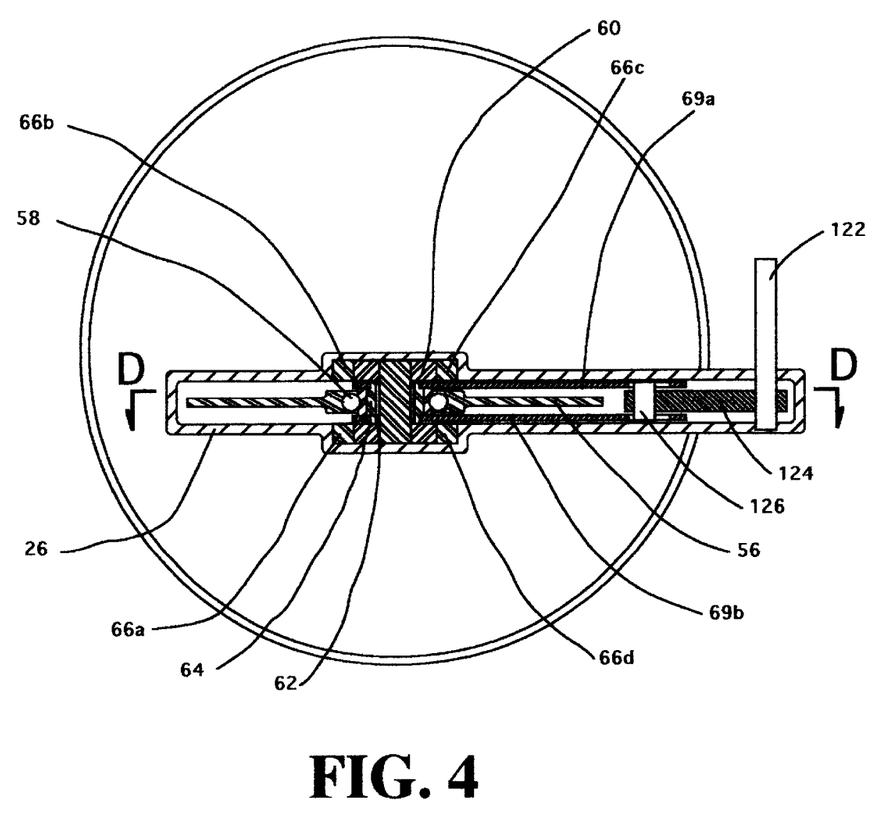
FIG. 4 is a sectional view along the line B—B of FIG. 1, depicting a method of control with an eccentric and a roller track.

FIG. 4 is a view through B—B of FIG. 1. Shaft 122 is the ratio control input shaft which may be positioned by any suitable means normally used to either manually or automatically select the CVT speed ratio. Ratio change arm 124, with pin 126, is fastened to turn with control shaft 122. Pin 126 engages both control arms 69a and 69b through slots in the control arms. The control arms 69a and 69b are attached to eccentric 64 so as to control the angular position of eccentric 64 with respect to roller assembly 60. Needle bearing 62 permits ease of rotation between eccentric 64 and the shaft of roller assembly 60.

Figure 5:
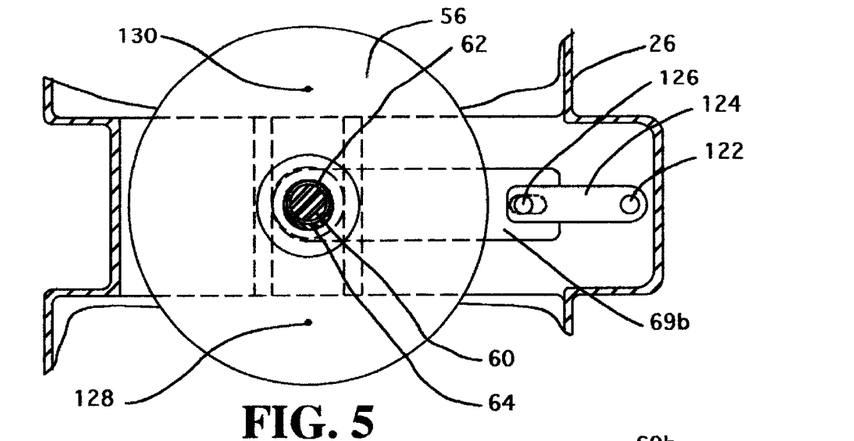
FIG. 5 is a top view along the line D—D in FIG. 4, in partial section, of a disk in rolling friction contact with the wheels of two output planetaries.

FIG. 5 is a sectional view along D—D of FIG. 4. Contact spots 128 and 130 are the elastic deflection areas of contact between disk 56 and planetary sun rollers 86 and 106, respectively. In FIG. 5, spots 128 and 130, the center of disk 56 and the center of roller assembly 60 are in a straight line.

Figure 6:
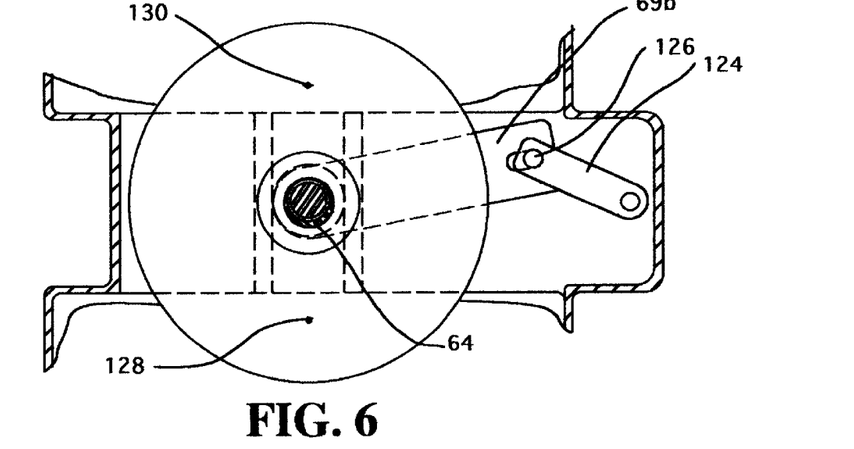
FIG. 6 is similar to FIG. 5 except that a control change of position calls for another ratio.

FIG. 6 is the same as FIG. 5 except that control members 122, 124, 126 and 69b have been moved so as to move the center of disk 56 off the line joining 128 and 130, by rotating eccentric 64.

Figure 7:
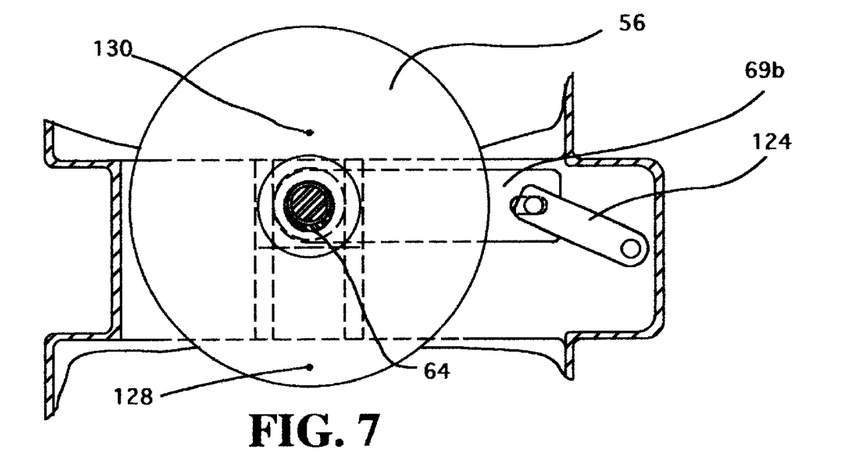
FIG. 7 is similar to FIG. 6 except that the disk position corresponds to attainment of the ratio called for in FIG. 6.

FIG. 7 shows that spots 128 and 130 are again co-linear with the center of disk 56 which has moved to a new position in response to the new position of ratio change arm 124.

Figure 8:
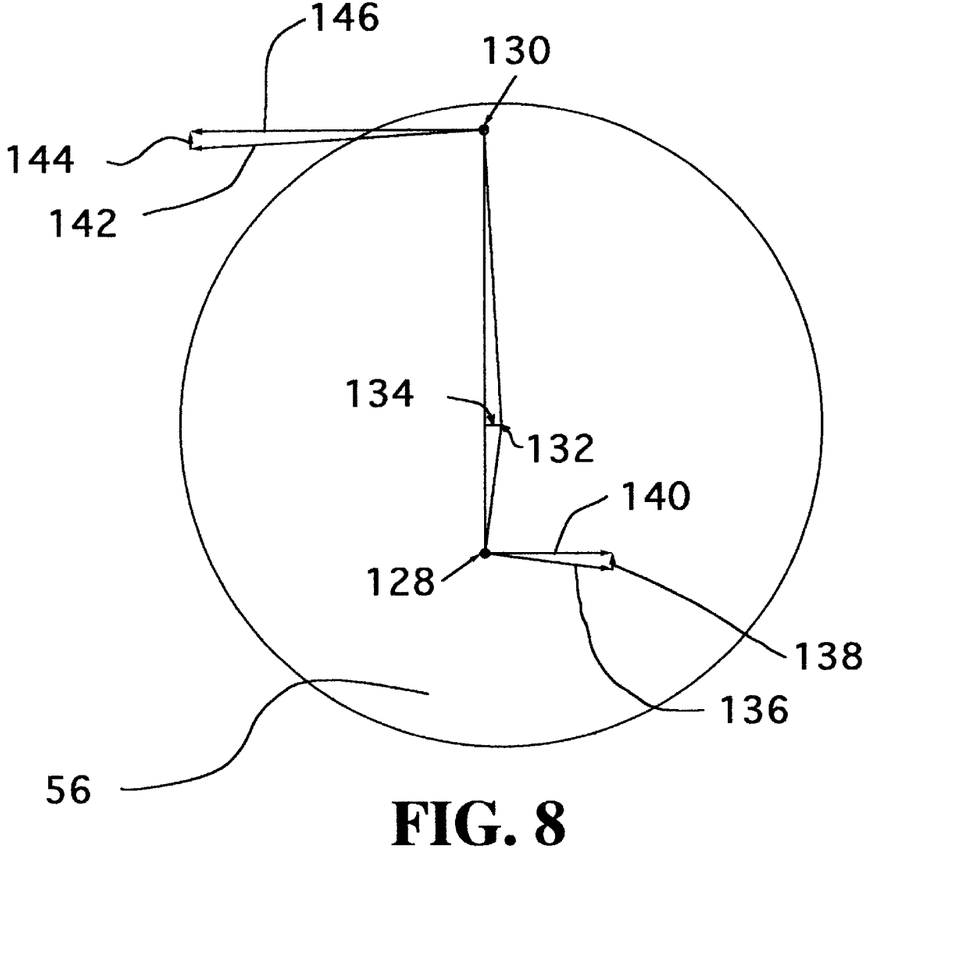
FIG. 8 is a velocity vector diagram showing velocity components when the eccentric has called for a new ratio in FIG. 6.

FIG. 8 is a velocity vector diagram of conditions which exist with contact spots 128 and 130 when the center of disk 56, at 132, is off the line, joining 128 and 130, by an amount 134. Vectors 136 and 142 are rotational velocity vectors resulting from the spinning of disk 56. Vectors 140 and 146 are the velocity vectors of the planetary rollers 86 and 106, respectively. Vectors 138 and 144 are the translational vectors urging the disk 56 to its new position of equilibrium.

Figure 9:
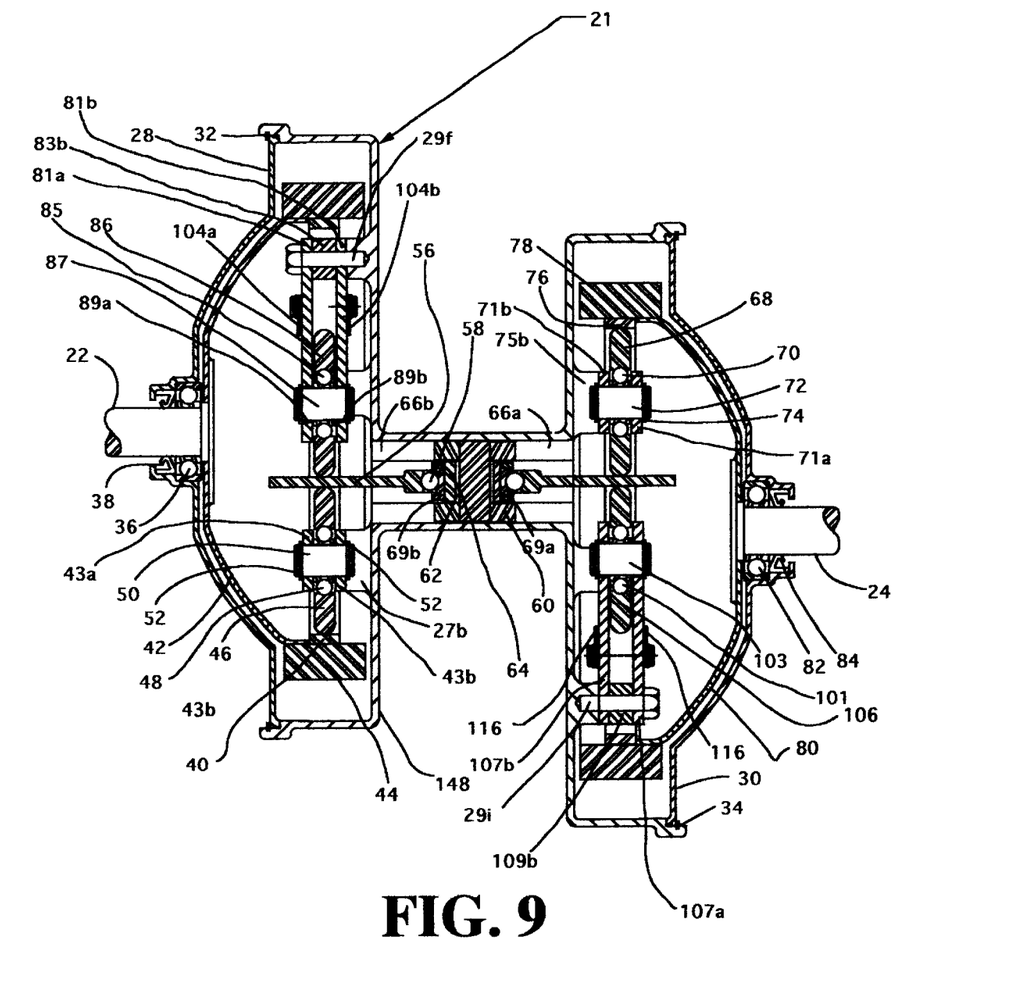
FIG. 9 is a side elevation similar to FIG. 1 of a system whose input and output members turn in the same direction.

FIG. 9 is the same as FIG. 1 except that one planetary assembly is flipped 180 degrees, about the disc, so that the planetary idler rollers are on the bottom in one planetary and on the top in the other planetary. This results in the same direction of rotation for input and output shafts 22 and 24, rather than the reversal of direction as in FIG. 1. A new casing 148 is the only part that is different from those of FIG. 1.

Operation

Operation of the CVT is based on the principle of transmitting power through rolling contact of one member forced against another with sufficient force to prevent gross slippage. This principle may be used in gaseous environments, including air and halocarbon vapors. Or, it may be used in the presence of oil or grease. Numerous oils and greases are available for this purpose. Some have higher tractive and lubricative properties than others and are the preferred materials. They are known as friction enhancing lubricants.

Referring to FIG. 1 and to FIG. 2, initial conditions of operation include pre-load forces between rolling members of the two planetaries and the disk 56. Thus the CVT is ready for power input at either shaft 22 or shaft 24.

Assume power input to shaft 22, turning in a clockwise direction as viewed from the input end. This would be the same as if the CVT were being driven by a conventional vehicle engine. Shaft 22, web 42, ring 40 and ring 44 would all rotate in unison because they are rigidly connected to each other. Bearing 36, in end bell 28, supports shaft 22 and permits its rotation. Rotation of ring 40 causes planetary roller 46 to rotate about pin 50 through bearing 48 because ring 40 and roller 46 are in contact with sufficient force to cause traction.

Similarly, rotation of ring 40 causes rollers 90 and 88 to rotate because of tractive contact caused by springs 104a and 104b acting on the inner race protrusions 92 and 98. The springs tend to force the planet rollers into the converging gap between the ring 40 and sun roller 86. Movement into the converging gap is resisted by the forces on sun roller 86. These forces also cause forces between disk 56 and sun roller 86 because the bearing 85 and pin 87 are free to move radially in slots 89a and 89b. Thus, rotation of rollers 90 and 88 also cause the sun roller 86 to rotate and in turn drive disk 56. Disk 56 is also being driven on the opposite face by roller 46. The contact of sun roller 86 and disk 56 may be directly opposite the contact between planetary roller 46 and disk 56, or, they may be slightly offset to compensate for a slight loss in velocity resulting from an extra contact in the path driving sun roller 86. Exact 50%–50% driving through the two different paths is not necessary and has only a small effect on the capacity or efficiency of the CVT.

Figure 10:
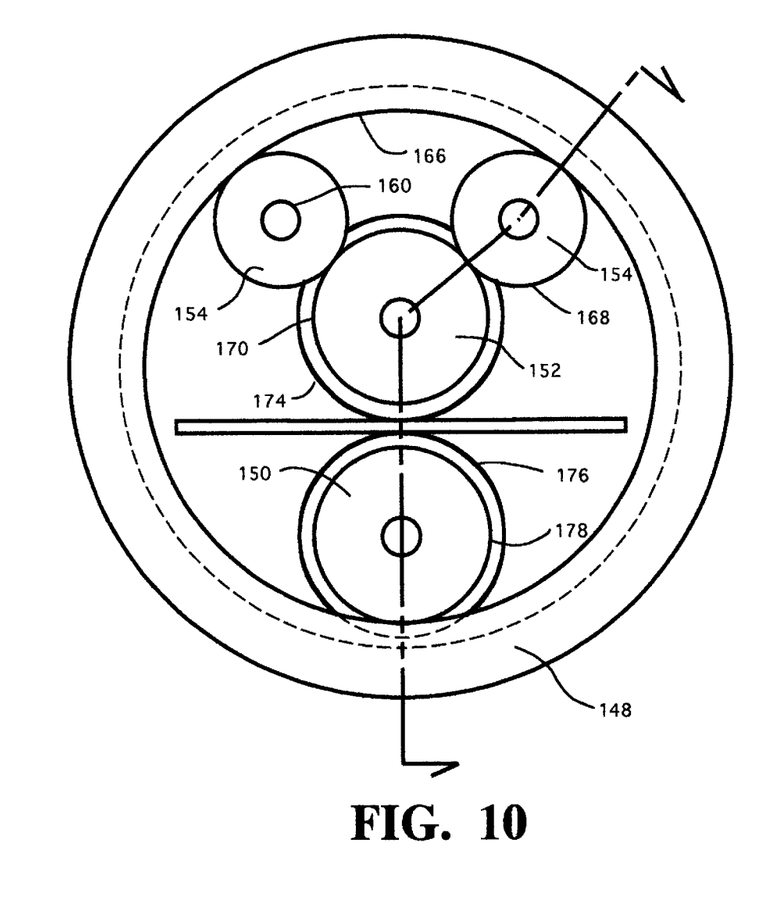
FIG. 10 is an elevation view of a planetary using different ring surfaces and wheel surfaces for rolling contacts.

Tractive forces acting on planetary roller 88, shown in FIG. 10, tend to wedge the roller into the converging gap between the ring 40 and the sun 86. Normal contact forces from ring 40 and from sun roller 86 must vectorially balance said tractive forces. This allows an increase in contact forces in response to an increase in tractive forces and thereby prevents slippage between the tractive elements. This is the same notion used by Dietrich in U.S. Pat. No. 1,093,922 for a fixed ratio friction planetary, except that a disk 56 has been interposed between rolling elements. Tractive forces on planetary roller 90 tend to drive it out of the gap into the diverging direction. This action is prevented by having the bearing inner race abutment surfaces 100 contact abutment surfaces 102 on the roller retaining members 81a and 81b. Normal contact forces are maintained on planetary roller 90 because ring 40 and its structure are permitted to deflect slightly so that the roller forces hold it in equilibrium. The fact that rollers 88 and 90 have very low inertia and that they must move only slightly to greatly increase the contact loads are a major advantage over prior art which must move parts having large inertias and must move them considerably further because of greater elastic deflections. This feature allows the subject invention to respond to sudden changes in transmitted torque which would cause other drives to slip and cause surface damage.

The ratio of speed between the input 22 and the disk 56 is dependent upon the position of the disk 56 with respect to the contact spots on rollers 46 and 86. The closer the center of disk 56 is to the contact spot, the faster disk 56 will turn. Conversely, as the center of disk 56 moves away from the contact spot, the slower disk 56 will turn. This is the method by which the invention achieves continuously variable speed ratios. Disk 56 is allowed to rotate freely by being supported by bearing 58. Bearing 58 is in turn mounted on eccentric 64 which is supported on needle bearing 62 on track roller assembly 60. Control arms 69a and 69b control the position of eccentric 64 with respect to roller assembly 60 and disk 56. Roller assembly 60 is constrained to travel in tracks 66a and 66b.

Power transmitted to disk 56 by rollers 46 and 86 is similarly transmitted by disk 56 to rollers 68 and 106 of the second planetary shown in FIG. 3. Referring to FIG. 3, which is looking at the planetary from the output side as depicted by view D—D of FIG. 1, the surface of disk 56 would be moving from left to right; rollers 68, 108, and 110 would be turning clockwise; roller 106 would be turning counterclockwise. Roller 108 would be pushing on ring 76 with a clockwise force while the reaction force would be pushing roller 108 into the converging portion of the gap between the sun roller 106 and the ring 76. Similarly since sun roller 106 is pushing on roller 108 in a direction to turn 108 clockwise, its force will tend to push 108 into the converging gap.

The normal forces must combine to resist the transmitted forces, and thus establish contact forces in proportion to transmitted torque. Low inertia and slight movement again achieve fast response to torque changes compared to prior art.

Operation of the ratio changing mechanism is explained referring to FIGS. 4, 5, 6, 7, and 8. The control shaft 122 may be rotated about its axis as constrained by housing 26. The position of control shaft 122 determines the position of control arm 124 which contains pin 126. When the arm 69b is aligned as shown in FIG. 5, a line between contact spots 128 and 130 passes through the center of disk 56.

When the position of the control shaft 122 is changed as in FIG. 6, the position of pin 126 is changed and drags the control arm 69 to a new position. The center of disk 56 is moved because of eccentric 64 attached to control arm 69. The line between contact spots 128 and 130 is no longer aligned with disk center 132, but is moved a distance 134 as shown in FIG. 8. Velocity vectors from the planetary wheels are shown as 140 and 146. Velocity vectors of the disk contact spots must be perpendicular to a line joining the spot and the disk center 132, and are shown as 136 and 142 in FIG. 8.

The difference in velocity vectors 136 and 140 give rise to a vector 138 which urges disk 56 to move so that the resultant velocity of contact spot 128 is the same as wheel vector 140. Similarly the resultant velocity vectors at contact spot 130 give rise to vector 144 which is similar in magnitude and direction as vector 138. Thus both contact spots produce forces and vectors urging the disc to a new position.

When the disk has moved so that conditions of alignment are as shown in FIG. 7, contact spots and the disk center again align and the vector urging movement of the disk again goes to zero.

Description—Alternative Embodiment

Figure 11:
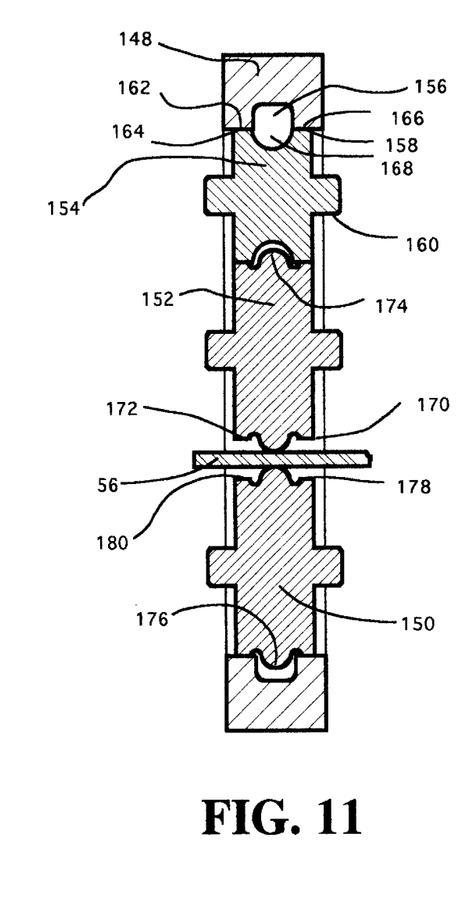
FIG. 11 is a section view of FIG. 10.

Referring to FIG. 10 and FIG. 11, an alternative compound planetary is shown which achieves a reduction in the number of contact stress cycles and which permits independent selection of the magnitude of contact stress in the various frictional contacts. Independent selection of contact stress is a means to prevent loss of traction due to hydroplaning which can occur at low contact stress values with some tractants.

This compound planetary may be used in place of the simple planetaries of FIGS. 1, 2 and 3.

Ring 148 replaces ring 44 of FIG. 1, and includes inner surfaces 162 and 166. Annular groove 156 is made to provide clearance between ring 148 and contact surface 176 of planet wheel 150.

Surfaces 164 and 158 on idler wheels 154 are in contact with ring 148 inner surfaces, 162 and 166, and with sun wheel 152 external surfaces 170 and 172.

Sun wheel 152 is in contact with disk 56 on surface 174.

Planet wheel 150 is in contact with ring 148 surfaces 162 and 166 on its surfaces 178 and 180. Planet wheel 150 is in contact with disk 56 on surface 176.

Bearing journals 160 are for mounting to bearings to permit rotation of the wheels.

The position of disk 56 is variable as in FIG. 1

Operation—Alternative Embodiment

Assume ring 148 is driven. Power from ring 148 to planet wheel 150 is transmitted through contacts of surfaces 178 and 180 of wheel 150 and inner diameter surfaces 162 and 166 of ring 148. Surface 176 of wheel 150 then drives the disk 56.

Ring 148 also drives planet idler wheels 154 through contacts with ring 148 inner surfaces 162 and 166, on surfaces 164 and 168 of wheels 154. Wheels 154 drive sun wheel 152 on surfaces 170 and 172. Sun wheel 152 then drives disk 56 through contact with surface 174 of sun wheel 152.

Thus, ring 148 drives disk 56 at a speed ratio dependent upon the position of disk 56 with respect to the driving contacts of surfaces 174 and 176. Contact stress cycles are reduced on surfaces 174 and 176 compared to FIG. 1, FIG. 2 and FIG. 3.

Contact surfaces 162, 166, 164, 158, 172, 170, 178, and 180, may be sized to prevent low traction due to hydroplaning on the tractant fluid.

Description—Additional Embodiment

Figure 12:
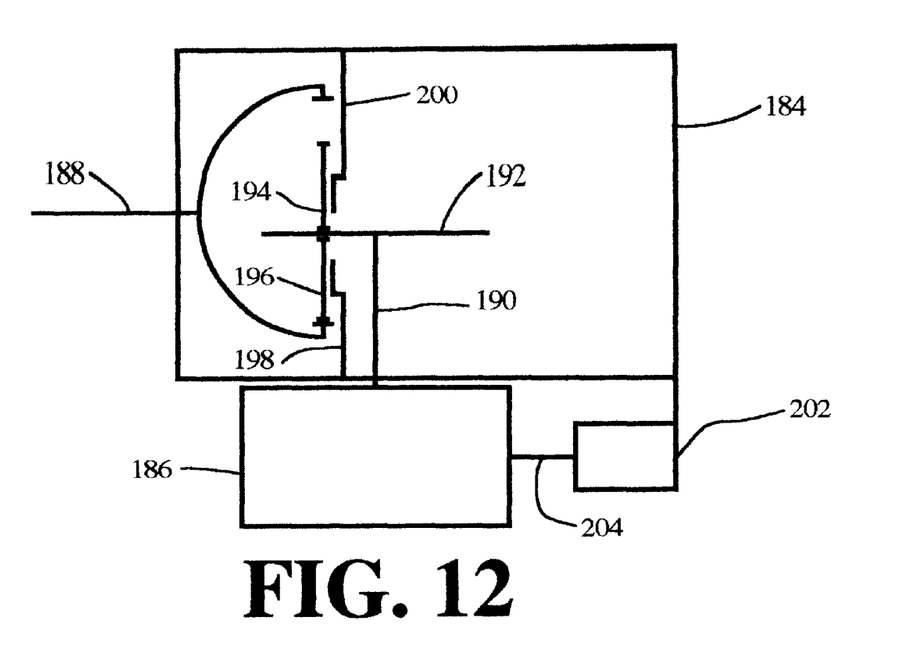
FIG. 12 is a schematic drawing of a disk used with a single planetary for variable speed.
Figure 13:
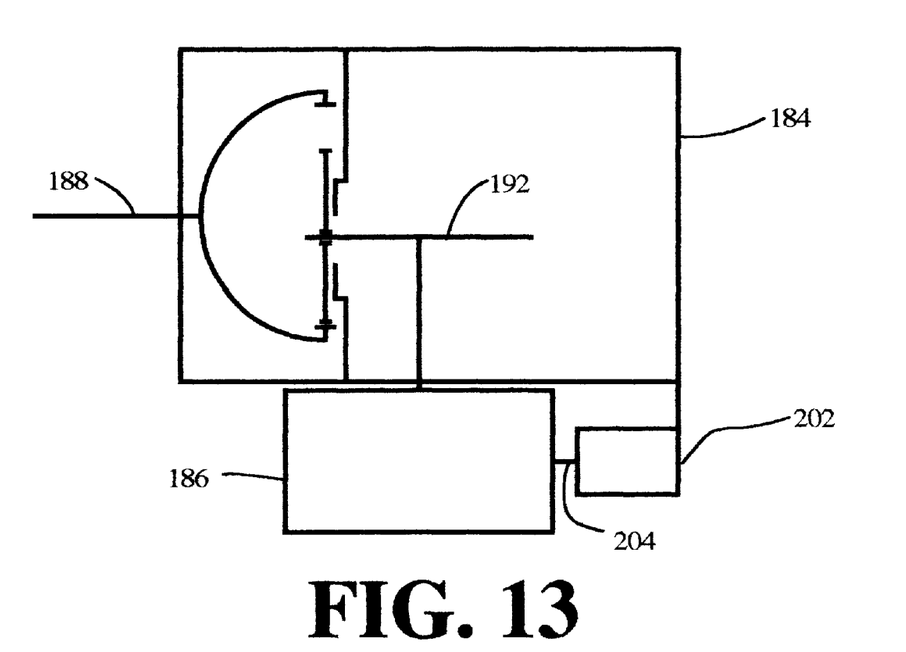
FIG. 13 is same as FIG. 12 except at a different speed ratio.

Referring to FIG. 12 and FIG. 13, an additional embodiment is shown in schematic form. A single planetary is used with a movable disk, driven by a power source. Housing 184 contains driving disk 192 which is connected to power source 186 through shaft 190. Disk 192 is in contact with the periphery of planet wheel 196, on one surface, and with the periphery of sun wheel 194 on the opposing surface.

Planet wheel 196 is rotationally supported by housing member 198. Sun wheel 194 is rotationally supported by housing member 200. Idler wheels as shown in FIG. 2 are included. Output assembly 188 is rotationally supported in housing 184 and is in tractional contact with planet wheel 196 and idler wheels.

Power source 186 is movable with respect to housing 184. Actuator 202 connects housing 184 to power source 186 through linkage 204.

Operation—Additional Embodiment

Referring to FIG. 12, rotational power from power source 186 rotates shaft 190 and disc 192. Disk 192 rotates wheels 194 1nd 196 through rolling traction. Planet wheel 196 rotates the ring of assembly 188 through rolling traction. Power from sun wheel 194 is transmitted to idler wheels which also drive the ring of assembly 188 through rolling traction. Idler wheels as shown in FIG. 1 control normal loads in response to the magnitude of torque. The speed ratio between power source 186 and output assembly 188 is determined by the position of disk 192.

Referring to FIG. 13, the speed ratio between power source 186 and output assembly 188 is increased, compared to FIG. 12. Position of disk 192 has been changed as a result of actuator 202 changing the length of linkage 204 and repositioning the power source.

CONCLUSIONS, RAMIFICATIONS AND SCOPE

Thus the reader will see that the continuously variable transmission of the invention provides a means that solves all of the problems of prior traction drives, and may be used to save fuel usage when used with engines of all sizes. The invention uses simple shapes that are economical to manufacture. The invention provides means to protect it from damage due to sudden overloads, is easy to control ratio changes, and capable of many different arrangements. The ability to achieve high efficiency by elimination of thrust bearings and low loss contacts are advantages over other continuously variable transmissions.

While my above descriptions contain many specificities, these should not be construed as limitations on the scope of the invention, but rather exemplifications of preferred embodiments. Many other variations are possible. For example, two, three, or more disks may be interposed between the two planetaries. Some of the planetary members may be gear driven. Other loading means described in prior art may be used. Such as split tapered rings, or shrink fits. Input and output shafts may be coaxial and on the same side of the planetaries. The invention may be used with other gear trains to achieve geared neutral, split power paths, synchronous shifts and non-synchronous shifts. All to extend the speed range.

Accordingly, the scope of the invention should be determined not by the embodiments illustrated, but by the appended claims and their legal equivalents.

Reference Numerals In Drawings

| | |
|---|---|
| 20 | continuously variable transmission |
| 22 | power shaft-left |
| 24 | power shaft-right |
| 26 | casing |
| 27 | boss of casing 26 |
| 28 | end bell-left |
| 29 | screw fasteners |
| 30 | end bell-right |
| 32 | retaining ring-end bell-left |
| 34 | retaining ring-end bell-right |
| 36 | bearing-power shaft-left |
| 38 | seal-power shaft-left |
| 40 | ring-traction-left |
| 42 | web-left |
| 43 | retainer plate |
| 44 | stiffening ring-left |
| 45 | retainer spacer |
| 46 | wheel-planetary-left |
| 48 | bearing-in wheel-left |
| 50 | pin-in wheel-left |
| 52 | retaining rings |
| 56 | disk |
| 58 | bearing-in disk |
| 60 | track roller assembly |
| 62 | needle bearing-eccentric |
| 64 | eccentric |
| 66 | guide ways |
| 68 | wheel-planetary-right |
| 69 | control arm |
| 70 | bearing-in wheel-right |
| 71 | retainer plate |
| 72 | pin-in wheel-right |
| 73 | retainer spacer |
| 74 | retaining rings |
| 76 | ring-traction-right |
| 78 | stiffening ring-right |
| 80 | web-right |
| 81 | wheel retainer |
| 82 | bearing-power shaft-right |
| 83 | retainer spacer |
| 84 | seal-power shaft-right |
| 86 | wheel-sun-left |
| 87 | pin |
| 88 | load wheel-left-driving (left) |
| 89 | slot |
| 90 | load-wheel-left-driven (right) |
| 92 | bearing-load wheel |
| 94 | abutment surfaces on inner race |
| 96 | abutment surfaces on casing |
| 98 | bearing-load wheel |
| 100 | abutment surfaces on 98 |
| 101 | bearing |
| 102 | abutment surfaces on casing |
| 103 | pin |
| 104 | springs-pre load |
| 105 | slot |

-continued

Reference Numerals In Drawings

| | |
|---|---|
| 106 | wheel-sun-right |
| 107 | wheel retainer |
| 108 | load wheel-right driving (right) |
| 109 | spacer |
| 110 | load wheel-right driven (left) |
| 112 | abutment surfaces connected to casing |
| 114 | abutment surfaces on inner race |
| 116 | springs-pre load |
| 118 | bearing |
| 120 | bearing |
| 122 | control shaft |
| 124 | ratio change arm |
| 126 | pin |
| 128 | contact spot-sun 86 |
| 130 | contact spot-sun 106 |
| 132 | center of disk 56 |
| 134 | amount eccentric displaced 132 from line joining 128 and 130 |
| 136 | velocity of rotation of disk 56 at spot 128 |
| 138 | velocity of translation of disk 56 |
| 140 | velocity of planetary wheel 46 or sun wheel 86 |
| 142 | velocity of rotation of disk 56 at spot 130 |
| 144 | velocity of translation of disk 56 |
| 146 | velocity of planetary wheel 68 or sun wheel 101 |
| 148 | planetary ring |
| 150 | planet wheel |
| 152 | sun wheel |
| 154 | idler planet wheels |
| 156 | annular clearance groove in ring 148 |
| 158 | idler wheel traction surface |
| 160 | bearing journals |
| 162 | traction surface of ring 148 |
| 164 | idler wheel traction surface |
| 166 | traction surface of ring 148 |
| 168 | annular clearance groove in idler wheels 154 |
| 170 | traction surface for sun wheel 152 to idler wheel 154 |
| 172 | traction surface for sun wheel 152 to idler wheel 154 |
| 174 | traction surface of sun wheel 152 to disk 56 |
| 176 | traction surface of planet wheel 150 to disk 56 |
| 178 | traction surface of planet wheel 150 to disk 56 |
| 180 | traction surface of planet wheel 150 to disk 56 |
| 184 | housing |
| 186 | power source |
| 188 | output assembly |
| 190 | input shaft |
| 192 | driving disk |
| 194 | sun wheel |
| 196 | planet wheel |
| 198 | housing support for planet wheel 196 |
| 200 | housing support for sun wheel 194 and idler wheels |
| 202 | actuator |
| 204 | linkage |

I claim:

1. A friction gearing transmission, comprising:

driving and driven means;

a friction gearing planetary;

said planetary includes a rotatable ring, a rotatable sun wheel and at least two rotatable planet wheels, a support for said sun wheel, and a support for said planet wheels;

a disc interposed between the sun wheel and a first planet wheel of said at least two planet wheels;

said disc being rotatably mounted about an axis transverse to the axes of the sun wheel and the at least two planet wheels, and in friction contact with said sun wheel and said first planet wheel;

means to cause normal forces to exist between adjacent rotatable members of said planetary and of said disc; and, whereby, power may be transmitted in either direction between the ring and the disc, and in either direction of rotation, at a ratio substantially determined by the size of the ring and the position of the disc.

2. The friction gearing transmission of claim 1, further including:
   means to vary the position of the axis of said disc with respect to the contact between said disc with said planet wheel and said sun wheel, thereby, varying the rotation ratio between said ring and said disc.

3. The friction gearing transmission of claim 2, further including:
   a second friction gearing planetary, comprising a rotatable ring, a rotatable sun wheel and at least two rotatable planet wheels, a support for said sun wheel, and a support for said planet wheels;
   said second friction gearing planetary being positioned on the opposite side of said disc to the first friction gearing planetary, and positioned so that the disc is interposed between the sun wheel and a planet wheel of said second friction gearing planetary;
   means to cause normal forces to exist between adjacent rotatable members of said second friction gearing planetary and said disc; and,
   whereby power may be transmitted from one of said planetary rings to the other, through the disc and planet members at a rotation ratio substantially determined by the size of the rings and their respective positions with regard to the axis of said disc, and in either direction of rotation.

4. The friction gearing transmission of claim 3, further including:
   means to vary the position of the axis of said disc with respect to the two planetaries,
   thereby changing the relative rotation ratio between the rings of the planetaries and achieving the effects of a continuously variable transmission.

5. The friction gearing transmission of claim 1 wherein said means to cause normal forces comprises:
   means to establish a preload, when no torque is being transmitted;
   two converging wedge shaped gaps formed by a radial gap between the peripheral surface of said sun wheel and the internal surface of said ring, a second planet wheel of said at least two planet wheels positioned in one wedge shape gap and in friction contact with the sun wheel and with the ring, and a third planet wheel of said at least two planet wheels positioned in the other wedge shaped gap and in friction contact with the sun wheel and the ring;
   means to vary the position of said second planet wheel, in response to the transmitted torque, so that said second planet wheel is urged further into said one wedge shaped gap when the torque is in a first direction; and said second planet wheel is prevented from movement out of said one wedge shaped gap when the torque is in the opposite direction;
   means to vary the position of said third planet wheel, in response to transmitted torque, so that said third planet wheel is urged further into said other wedge shaped gap when the torque is in the opposite direction; and said third planet wheel is prevented from moving out of said other wedge shaped gap when the torque is in the first direction,
   thereby creating forces between all friction members, substantially in proportion to the transmitted torque, in such a manner as to prevent damaging slippage between members transmitting power.

6. The friction gearing transmission of claim 5, wherein, said preload results from means to urge at least one of the planet wheels into one of the wedge shaped gaps between the sun wheel and the ring of said planetary.

7. The friction gearing transmission of claim 1, further including:
   means to move the axis of said disc parallel to the plane of said planetary so as to create a force, in the area of contact, urging the disc either closer to, or further from, the plane of said planetary;
   means to permit movement of said disc axis either closer to or further from the plane of said planetary,
   thereby utilizing the power being transmitted through the disc to aid in changing the rotation ratio between the disc and the ring.

8. The friction gearing transmission of claim 7, wherein said means to move the axis of said disc includes:
   an eccentric mounted to the rotatable means of the disc; and means to move said eccentric.

9. The friction gearing transmission of claim 8, wherein:
   said eccentric is rotationally movable by a lever;
   said lever being capable of being set to a new position and causing power through the unit to drive the disc axis until it aligns with the new position of said lever,
   thereby using the position of the lever to determine a new rotation ratio which is approached asymptotically.

10. The friction gearing transmission of claim 1, further comprising a friction enhancing lubricant which includes polymers of trifluorochloroethylene.

11. The friction gearing transmission of claim 1, further comprising a friction enhancing fused alicyclic lubricant.

12. The friction gearing transmission of claim 3, wherein the ring of the first planetary and the ring of the second planetary rotate in opposite directions.

13. The friction gearing transmission of claim 3, wherein the ring of the first planetary and the ring of the second planetary rotate in the same direction.

14. The friction gearing transmission of claim 4, where at least one of said rotatable members of said planetaries and of said disc are mounted in sliding hydrodynamic bearings, rather than rolling contact bearings.

15. The friction gearing transmission of claim 1, wherein the planetary members include:
   a sun wheel having friction contacts on at least two different circumferences, where at least one of said circumferences is in contact with a circumference of a planet wheel which is intermediate the sun wheel and the ring, and one of said friction contacts is with the disc;
   at least one intermediate planet wheel having at least one friction contact with the ring and one friction contact with the sun;
   the planet wheel between the disc and the ring having at least two different circumferences, where at least one circumference is in friction contact with the ring and a different circumference in friction contact with the disc;
   the ring having at least one inner surface for contacting the planets and an annular clearance for the circumference of the planet wheel which is in friction contact with the disc,
   thereby reducing the number of stress cycles on the planetary members, for longer life, and, also, thereby permitting design freedom to choose surface curvatures which overcome hydroplaning and maximize traction.

* * * * *